United States Patent [19]

Shively et al.

[11] Patent Number: 4,790,255
[45] Date of Patent: Dec. 13, 1988

[54] WIND AND BOOM DIRECTION INDICATING DEVICE

[76] Inventors: Nina Shively; Peter Cordes, both of P.O. Box 136, South Kent, Conn. 06785

[21] Appl. No.: 64,559

[22] Filed: Jun. 22, 1987

[51] Int. Cl.⁴ .............................................. G01W 1/02
[52] U.S. Cl. ..................... 114/97; 114/144 C; 73/188; 116/265; 116/274; 116/284
[58] Field of Search ............... 114/144 C, 144 E, 343, 114/97, 98; 73/188, 189; 116/265, 284, 303, 274

[56] References Cited

U.S. PATENT DOCUMENTS

| | | | |
|---|---|---|---|
| 419,608 | 1/1890 | Maret | 73/188 |
| 3,371,529 | 3/1968 | Tillman | 73/188 |
| 3,395,577 | 8/1968 | Kevin | 73/188 |
| 3,478,585 | 11/1969 | Scannell | 73/188 |
| 3,845,734 | 11/1974 | Demos | 116/200 |
| 4,031,754 | 6/1977 | Bedard | 73/188 |
| 4,314,477 | 2/1982 | Yancy | 73/188 |
| 4,646,567 | 3/1987 | Ahmer | 73/188 |

Primary Examiner—Sherman D. Basinger
Assistant Examiner—Clifford T. Bartz
Attorney, Agent, or Firm—CTC & Associates

[57] ABSTRACT

There is provided a device useful for adjusting the main sail of a sailboat said device being equipped with apparent wind indicating means and color coded means for indicating desirable position for the boom of said main sail; said device being used alone or in combination with the main sail control sheet having color coded portions or with actual boom position indicating means having color coded sections; said color coded portions and color coded sections coinciding with the color coded desirable boom position indicating means.

2 Claims, 2 Drawing Sheets

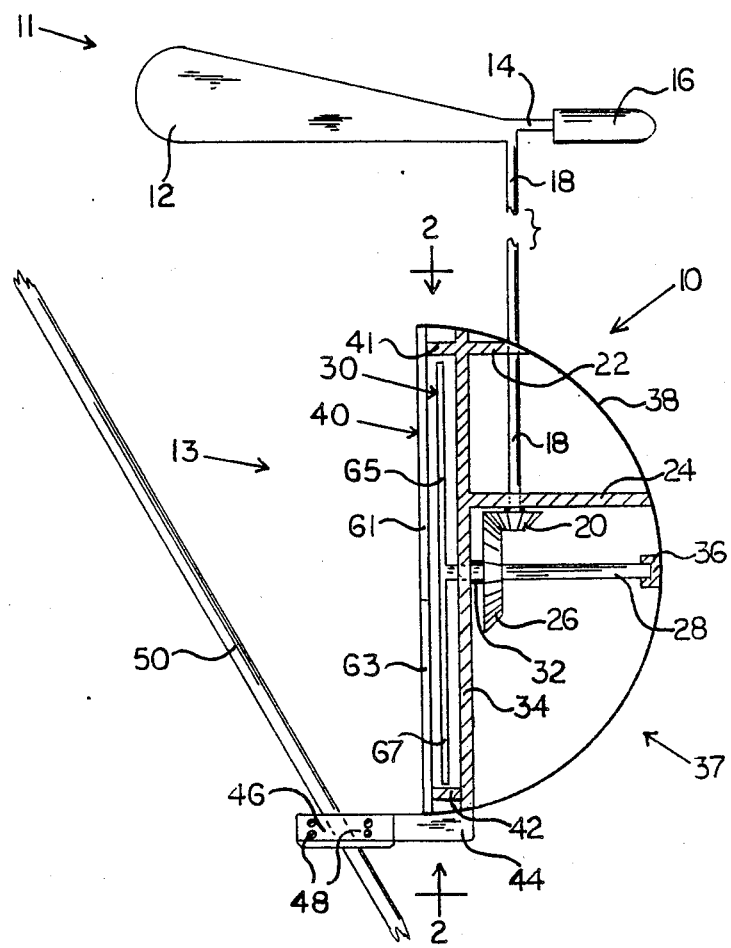
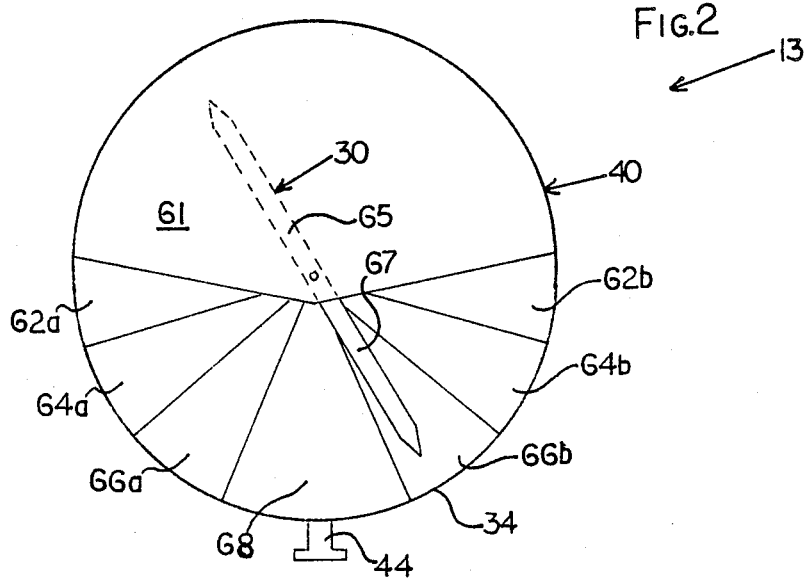

WIND AND BOOM DIRECTION INDICATING DEVICE

This invention deals with a sailing device designed to assist especially the novice sailor to correlate apparent wind direction and desirable boom position for a given course.

BACKGROUND OF THE INVENTION

The art of sailing essentially deals with the positioning of the main sail or the main sail boom in relationship to the apparent wind and the course or direction of the boat. The direction of the apparent wind (which is defined by two vectors: the actual wind speed and direction and the boat speed and boat direction or course) may be indicated by many known means being it by so-called tell-tails at the forestay or shrouds or by wind vanes, usually placed on top of the mast, and such devices may range from simple pieces of cloth or string to complicated and highly precise wind and wind speed indicators. Typical of such devices are represented by the following references of interest.

| Patent Number | Date | Inventor |
| --- | --- | --- |
| 419,608 | January 14, 1890 | Maret |
| 2,363,087 | November 21, 1944 | Salisbury |
| 3,371,529 | March 5, 1968 | Tillman |
| 3,478,585 | November 18, 1969 | Scannell |
| 3,641,815 | February 15, 1972 | Fassett |
| 3,845,734 | November 5, 1974 | Demos |

Maret discloses an anemoscope consisting of a wind or weather vane being placed on top of a spindle having at the other end a gear designed to activate a pointer which indicates the compass direction of the wind. This device, suggested to be used on, for instance, the gable of a house, would not be useful for the intended purpose of this invention.

Salisbury describes a wind course indicating means which provide the sailor information about wind direction with respect to the boat's course. This device does not teach the sailor where to position the main sail boom.

Tillman is concerned with a wind vane indicating the direction of the (apparent) wind, however, no means are provided for indicating where to locate the main sail boom in relation to the boat.

Scannell deals with a sailing accessory including a wind vane mounted on top of the mast, actual boom position actuating means, indicating means for apparent wind direction, actual and desirable boom directions, as well as means for transmitting wind direction information via a combination of selsyn generator, signal transmitting means and synchromotor plus suitable gearing arrangement; also servo-mechanism type connection between boom position activating means and indicating means therefor. This sophisticated if not complicated accessory is permanently attached to the respective location i.e. the wind vane on top of the mast, the indicating means below deck or in the cockpit, and the boom position activating means at the junction of boom and mast. Because of items such as selsyn generator, synchromotor, electrical connections therefor as well as indicating gear and servo-mechanism and the like, such a system is costly because it must be protected from moisture and especially salt water spray if used off coast.

Fassett teaches a wind indicating system allowing read-out of apparent wind angle in relation to boat direction either on 0–180 degree scale of a 20–50 degree port or starboard scale. Nothing is provided to indicate desirable main boom position.

Demos deals with an apparent wind indicator and indicating means for aligning the boom to a favored position on one particular course. This system lacks means for indicating desirable boom position regardless of boat course in relation to wind.

The wind direction devices also providing information of the desirable boom position are either too complicated, too heavy or too expensive to be useful on a boat employed for teaching the art of sailing to a novice or to provide indication means to the more experienced sailor, such means being readily installed, readily maintainable, simple in design and readily understandable.

SUMMARY OF THE INVENTION

It is the object of this invention to provide means for indicating apparent wind direction and desirable boom position for a given sailboat course.

It is a further object of this invention to provide apparent wing and desirable boom direction means comprising a combination of wind vane-activated boom positioning device and means for indicating actual boom position.

It is still a further object of this invention to provide an apparent wind and desirable boom position indicating device which can be readily installed, is easy to maintain and is easy to use.

It is still another object of this invention to provide a method for teaching the sailing novice or the more advanced sailor the position of the main sail boom in relation to wind direction and course of the boat.

Other objects of this invention shall become apparent by the description and appended claims.

BRIEF DESCRIPTION OF THE DRAWINGS

FIG. 1 is an elevated cross-sectional side view of a combination apparent wind direction and desirable boom position indicating device of this invention;

FIG. 2 is an elevated back view of FIG. 1 along lines 2—2;

DESCRIPTION OF THE PREFERRED EMBODIMENTS

Figure 3:
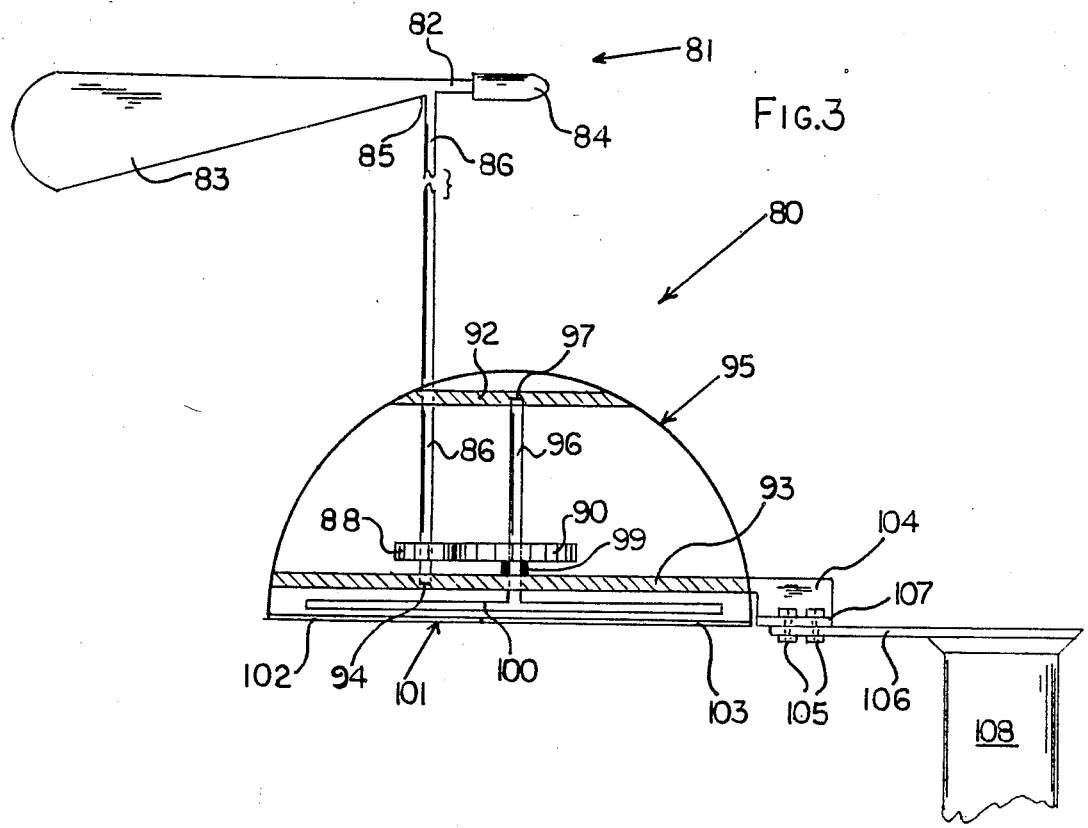
FIG. 3 is an elevated cross-sectional side view of another embodiment of a device of this invention.

FIG. 1 illustrates a device 10 in accordance with this invention combining apparent wind indicating (AWI) means 11 and desirable boom position (DBP) indicating means 13. Said AWI means 11 comprising wind vane blade 12 and counterweight 16 both being attached to wind vane extension 14, said extension 14 being attached to main wind vane shaft 18 which carries at its lower extremity conical drive gear 20 and is held in position by upper support 22 and center support 24 so as to be freely rotatable about its axis for 360 degrees or more; conical drive gear 20 engages conical main gear 26 which is firmly connected with main shaft 28, the latter resting at one end against bearing 36 and being held in place by bushing 32 resting against main disc 34, the main shaft 28 rotatably penetrating main disc 34 and carrying at the other extreme end DBP pointer 30; the DBP mechanism is all enclosed in casing 37 which includes hemispherical cover 38 and face plate 40, both integrally reinforced by upper support 22 including support extension 41 and main disc 34 including the lower extension 42; main disc 34 is extended at its lower end and penetrating cover 38 forming fastening base 44 including clamping means 46 holding the device 10 in place by being fastened around a forestay 50 (only partially shown) by nut and bolt arrangement.

It will be understood that as wind vane 11 is turned about its axis 18, gear 20 engages main gear 26 and causes DBP pointer to turn whereby the radius ratio of main gear 26 to drive gear 20 is 2 to 1; i.e. as the wind vane turns 360 degrees, the DBP pointer covers an angle of only 180 degrees, wind vane and DBP pointer being at 0 (zero) and 180 degrees, respectively, when the wind comes directly over the bow of the boat; and when the apparent wind comes directly from abaft of the boat, the wind vane will be pointing at 180 degrees, whereas the DBP pointer will show 90 degrees, in the latter case it will be appreciated that the boom may be located 90 degrees to port or starboard based on the boat's bow-stern center line.

FIG. 2 illustrates the front view of FIG. 1 (forestay 50, clamping means 46 and wind vane 11 have been omitted) with DBP pointer means 13 shown including face plate 40 having opaque section 61 and the clear section of face plate 40 allowing view of main disc 34 which has marked thereon position sectors 62a, 62b, 64a, 64b, 66a, 66b and 68 as well as DBP pointer 30 having indicating arms 65 and 67; also shown is fastening base 44; it will be appreciated that the above mentioned sectors, in pairs (except for sector 68) may follow a color scheme for easy visibility and identification such as 62a and 62b being red, sectors 64a and 64b being white, sectors 66a and 66b being blue and sector 68 being green; the choice of colors is not critical as long as they are clearly visible and distinguishable from each other; the DBP pointer is suggested to be of black color, but any other distinguishable color or color scheme may be chosen.

When in use, i.e. if the sailboat is steered on a set course and the AWI points in a direction other than straight ahead, the DBP pointer 30 will be occupying a certain area of one of the above mentioned sectors e.g. sector 66b, advising the sailor to set the boom at an angle from the boat centerline essentially coincidental with said pointer. Other, preferred means for translating DBP pointer indication into actual boom position shall be discussed below.

In FIG. 3 there is depicted a variation of an apparent wind and desirable boom position indicating device 80 of this invention including AWI means 81 comprising wind vane blade 83, counterweight 84 connected by shaft 82 which is also attached to turning shaft 86, the latter rotatably passing through casing cover 95, upper support 92 and carrying (nonconical) drive gear 88, the extreme lower end of shaft 86 resting in and against the recess 94 of main disc 93; drive gear 88 intermeshes with main gear 90 which is permanently attached to axis 96, the latter being restraint at its upper end by recess 97 of upper support 92 and in its lower region by bushing 99 resting against main disc 93; axis 96 penetrating said main disc 93 and carrying at its extreme lower end DBP pointer 100; the DBP mechanism being enclosed by curved housing cover 95 and flat circular face plate 101, the latter having an opaque portion 103 and a clear portion 102; main disc 93 is extended through cover 95 by fastening plate 104 having flared sections 107 (only one shown) which is fastened to extension plate 106 of mast 108 by nut and bolt means 105.

This device arrangement provides an option to the practitioner to attach a device of this invention to the top of the mast for unobstructed visibility. For that matter, the combination AWI and DBP indicating device of this invention, as for instance depicted in FIG. 1 may be attached to the forestay or, if the boat is equipped with a headsail, two of the devices may be mounted to either side of the foredeck or to a port and starboard shroud having at least one device non-obscured by such headsail and indicate non-obstructed apparent wind, respectively.

In order to further facilitate use of the device of this invention it is envisioned that the line or sheet controlling the main sail boom may have color coded portions coinciding with the colored sectors of the main disc(s), i.e. if the DBP pointer of the device is located in the green sector, then the green colored portion of the main sheet should to be run at a marker designated for that purpose, for instance one of the main sheet blocks.

Figure 4:
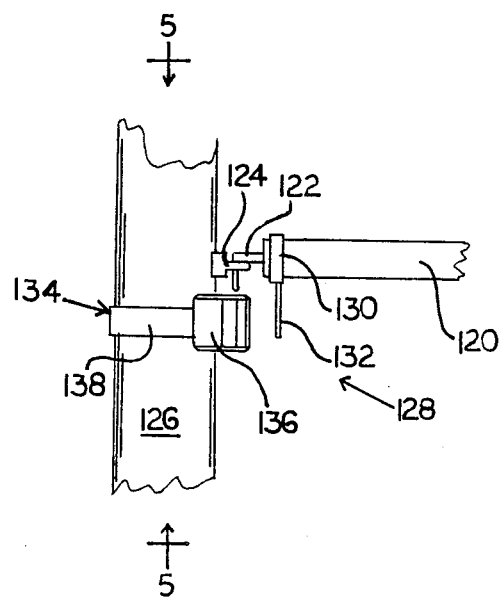
FIG. 4 is an elevated side view of a device indicating the boom position according to this invention.
Figure 5:
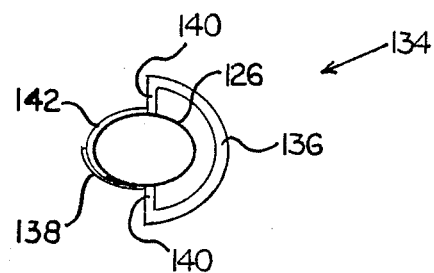
FIG. 5 is a top view of FIG. 4 along lines 5—5.
Figure 6:
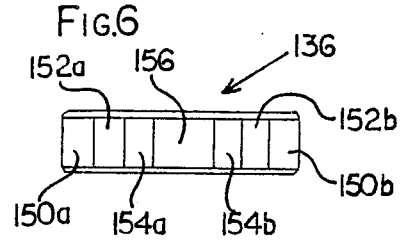
FIG. 6 is a face view of an actual boom position indicating means in a non-distorted fashion.

Another and preferred means for readily correlating DBP indication and actual boom setting or position is illustrated in FIGS. 4, 5 and 6, wherein main boom 120 attached to mast 126 by a hook 122 and eye 124 arrangement, said mast 126 having fastened thereto actual boom position (ABP) indicator 134 comprising ABP face portion 136 and fastening means 138; whereas the boom carries pointer 128 consisting of strap 130 holding in place finger 132. As seen especially in FIG. 5, ABP indicator 134 is held off mast 126 by spacing portions 140 in order to afford better visibility and bring indicator 134 into closer proximity to boom 120 and finger 132 (shown in FIG. 4); also indicated is hook 138 and loop 142 type fastening combination for item 134. FIG. 6 depicts ABP face portion 136 being subdivided into sections 150a, 150b, 152a, 152b, 154a, 154b and 156, each section carrying the color coding previously mentioned, e.g. 150a and 150b: red; 152a and 152b: white; 154a and 154b: green; and 156: blue. As pointed out above, such colors are only suggested, other colors and color combinations may be chosen as long as they coincide with the colors of the DBP pointer and are readily distinguishable.

Having set a certain course for the sailboat, the sailor observes the DBP pointer, e.g. the DBP pointer being in the white starboard sector and adjusts the main sheet so that the finger at the end of the boom resides in front of the starboard white section of the face portion.

Although the face portion is for practical purposes kept flat, the curved cover may be of any shape be it hemispherical, ellipsoid, cylindrical, conical, or the like, keeping in mind that the configuartion providing the least wind resistance yet giving maximum structural stability to the instrument is most preferred.

Useful materials of construction for the AWI and DBP device are metal such as aluminum, bronze, brass, stainless steel, nickel or chromium coated steel and the like or plastics such as polyamides, polyesters, polystyrene, poly(butadiene-styrene-acrylonitrile) polyethylene, polypropylene, aramide, poly(vinyl chloride), polyurethanes and the like, or combinations thereof, whereas the ABP indicator and the boom finger may be constructed either from materials recited above or from more flexible material such as natural rubber, poly(styrene-butadiene), polyurethane, poly(ethylene-propylene-non-conjugated diene), butyl rubber and like elastomers. Any suitable fastening means for ABP indicator and boom finger may be chosen such as hook-and-loop type materials, elastic bands or strings or ring clamps and the like.

The sectional divisions in FIG. 2 generally represent well known points of sailing, i.e. beating, reaching, broad hauling, whereas running is conducted with the main sail boom essentially at 90 degrees in relationship to the boat s centerline. Such points may be further refined: beating high, beating, close reaching, reaching, broad reaching and running, yet, the number and width of these divisions may be up to the user, and it is not the object of this invention to dictate such details but provide the means for realizing such points of sailing.

The sailing device of this invention may not only be used on single masted, single sail equipped boats such as dinghies, so-called cat boats or certain catamarans, but also on single hull or multi-hull type boats having a plurality of sais such as sloops and cutters, catamarans, trimarans as well as by sailing vessels having a plurality of masts such as ketches, yawls, schooners, barks and the like, because in each instance the position of the main sail(s) is critical as to efficient use of wind in relation to boat course.

Although only preferred embodiments of this invention have been disclosed it will be understood that various changes and modifications may be made without departing from the spirit and scope of this invention as defined in the appended claims.

What is claimed is:

1. A means for correlating in a sailboat desirable boom position with actual boom position comprising in combination a first device indicating desirable boom position comprising a wind vane mounted on one end of a rotatable shaft having attached thereto at its other end a drive gear intermeshing with a main gear being affixed to one end of a rotatable shaft penetrating a main disc and carrying at its other end a double ended pointer, wherein the lower half of the main disc is divided into colored sectors indicating desirable boom position and wherein the radius ratio of the main gear to the drive gear is two to one; and a second device indicating actual boom position comprising an essentially semicircular face portion having marked sections color coded coincidental with the main disc sectors and being attachable to the mast, and a pointer being attachable to the boom in close proximity to the face portion; wherein observation as to which color sector is indicated by said first device allows proper adjustment of the boom so that the indicator of the second device rests within the appropriate colored section; and wherein said first device and said second device are independent of each other and do not require any electrical circuitry in order to indicate desired and actual boom positions.

2. A method for setting the boom in a sailboat in proper relation to course and the direction of the wind comprising providing a first device indicating desirable boom position comprising a wind vane mounted on one end of a rotatable shaft having attached thereto at the other end a drive gear intermeshing with a main gear being affixed to one end of a rotatable shaft penetrating a main disc and carrying at the other end a double ended pointer, wherein the lower half of the main disc is divided into colored sectors indicating desirable boom position, and wherein the radius ratio of the main gear to the drive gear is two to one; and a second device indicating actual boom position comprising an essentially semicircular face portion having marked sections color coded coincidental with the main disc sectors and being attached to the back of the mast below the point where the boom is fastened; and a pointer attached to the forward end of the boom and in close proximity to the face portion; observing the desirable boom position as indicated by the first device and adjusting the boom direction so that the pointer of the second device rests within a colored section coincidental with the colored sector of the first device.

* * * * *